United States Patent [19]
Hooper

[11] Patent Number: 5,603,218
[45] Date of Patent: Feb. 18, 1997

[54] CONVERSION OF WASTE HEAT TO POWER

[76] Inventor: Frank C. Hooper, 5 King's College Road, Toronto, Ontario, Canada, M5S 1A4

[21] Appl. No.: 636,933

[22] Filed: Apr. 24, 1996

[51] Int. Cl.$^6$ ................................................ F01K 23/10
[52] U.S. Cl. ............................... 60/655; 60/651; 60/671; 60/676
[58] Field of Search ............................. 60/655, 651, 671, 60/676

[56] References Cited

U.S. PATENT DOCUMENTS

| | | | |
|---|---|---|---|
| 3,945,210 | 3/1976 | Chapin | 60/655 |
| 4,116,005 | 9/1978 | Willyoung | 60/655 |
| 4,637,212 | 1/1987 | Aguet | 60/655 |
| 5,431,016 | 7/1995 | Simpkin | 60/655 |

*Primary Examiner*—Ira S. Lazarus
*Assistant Examiner*—Alfred Basichas

[57] ABSTRACT

Conversion of heat from high-temperature off-gases into useful work is accomplished with a process having first and second stages. The first stage comprises preheating feed water with heat from the off-gases, converting this into steam, passing the steam into a steam expander which drives a first machine, condensing the low pressure exhaust from the expander, and returning the condensate to the preheater to repeat the cycle. The second stage comprises preheating liquid fluorocarbon working fluid, passing the working fluid through a separator and then through the steam condenser, from which a liquid/gas mixture of the working fluid is routed back to the separator, superheating the gaseous working fluid by off-gases, passing the gaseous working fluid into an expander which drives a second machine, condensing the low pressure exhaust from the expander, and returning the liquid fluorocarbon working fluid to the preheater to repeat the cycle. Heat is provided to the process by passing high temperature off-gases, 350 to 1100 degrees Celsius, in sequence through the steam superheater, the water boiler, the fluorocarbon superheater, and the feed water heater.

21 Claims, 1 Drawing Sheet

CONVERSION OF WASTE HEAT TO POWER

FIELD OF THE INVENTION

The present invention relates to the recovery of waste heat from high-temperature exhaust gases. In particular it relates to a binary cycle for the recovery of heat in exhaust gases, e.g. from incinerators, and the efficient conversion of such heat to useful work.

BACKGROUND TO THE INVENTION

The recovery of heat from high-temperature exhaust gases is known. For example in waste incinerators heat from off-gases is used to make steam, and the steam is then used to drive a single stage steam turbine. The turbine shaft power output is then used to generate electricity. The energy conversion efficiency of such a system is relatively low, e.g. about 30%. It is possible to increase the efficiency of such a system by using the low-pressure steam, which exits from the high-pressure turbine, to drive a low-pressure turbine and thus capture more useful work from the steam. However, such low pressure turbines are relatively large and expensive. In addition, turbine blades in the low pressure turbine erode at unacceptable rates, unless expensive reheat equipment is added.

There is a need to improve the efficiency of recovery of useful work obtainable from the heat in exhaust gases of waste incinerators and the like. In the case where the recovery system is used to generate electricity, an advantage of improving efficiency is the lowering of operating costs per kilowatt-hour of energy produced. A further advantage is that the additional electrical energy obtained reduces by a corresponding amount the quantity of fossil fuel that would otherwise have been burned to produce a similar amount of electrical energy. Thus, there is less fossil fuel depletion, less air pollutant production and less global warming due to carbon dioxide production.

The present invention is directed to improving the efficiency of the recovery of heat and of the conversion of heat to useful work, using a binary cycle.

DESCRIPTION OF THE INVENTION

As used herein the term "off-gas" relates to exhaust gases of combustion emanating from furnaces, boilers, incinerators and the like.

Accordingly, the present invention provides a process for the conversion of heat from high-temperature off-gases into useful work, said process comprising first and second stages and heat input, in which:

the first stage comprises
i) passing feed water through a feed water preheater which is heated by off-gas, to form preheated feed water
ii) converting said preheated feed water into steam in a steam boiler which is heated by off-gas;
iii) superheating said steam in a steam superheater which is heated by off-gas;
iv) passing said superheated steam into a steam expander which allows expansion of said superheated steam, thus producing shaft work, released as a result of such expansion, to operate a first machine, and exhausting low pressure steam;
v) feeding said low pressure steam through a steam condenser to form condensed feed water; and
vi) passing the feed water through the first stage again starting at step i);

the second stage comprises
a) passing liquid fluorocarbon working fluid into a separator, from where liquid fluorocarbon working fluid passes through a heat exchanger in said steam condenser thus converting some of the liquid fluorocarbon into gaseous fluorocarbon, whence the mixed liquid and gas is returned to the separator in which the gas is separated from the liquid fluorocarbon;
b) superheating the gaseous fluorocarbon working fluid in a gaseous fluorocarbon superheater which is heated by off-gas;
c) passing said superheated gaseous fluorocarbon working fluid through a fluorocarbon expander which allows expansion of said superheated gaseous fluorocarbon working fluid, thus producing low pressure gaseous fluorocarbon working fluid and producing shaft work, released as a result of such expansion, to drive a second machine;
d) feeding said low pressure gaseous fluorocarbon working fluid through a fluorocarbon condenser to give up its latent heat and form liquid fluorocarbon working fluid;
e) pumping the liquid fluorocarbon working fluid through the second stage again, starting at step a); and the heat input comprises providing heat to the process by passing high temperature off-gas in sequence through the steam superheater, the water boiler, the fluorocarbon superheater and the feed water heater.

In a preferred embodiment the first stage also comprises pumping the feed water through a fluorocarbon working fluid preheater before passing the feed water through the first stage again, and passing liquid fluorocarbon working fluid from the fluorocarbon condenser to the separator through a fluorocarbon working fluid preheater to preheat the liquid fluorocarbon working fluid, using heat drawn from the condensed water which leaves the steam condenser In one embodiment, the fluorocarbon working fluid is selected from the group consisting of chlorofluorocarbons and hydrochlorofluorocarbons.

In a specific embodiment the fluorocarbon working fluid is selected from the group consisting of chlorotetrafluoroethane and dichlorotrifluoroethane.

In a preferred embodiment at least one of the feed water preheater and the fluorocarbon working fluid preheater are arranged as a counterflow preheater.

In a further embodiment the initial temperature of the high temperature off-gas is from about 350° C. to about 1100° C. Preferably the initial temperature of the high temperature off-gas is in the upper end of this range, e.g. about about 700° C.

In yet another embodiment the fluorocarbon expander is selected from the group consisting of turbines and rotary expanders, and especially a gerotor rotary expander.

In a further embodiment the steam expander is selected from the group consisting of turbines, reciprocating expanders and rotary expanders, and especially is a steam turbine.

In another embodiment the steam expander and fluorocarbon expander are used to generate electricity with the shaft work from the first and second stages.

The present invention also provides a heat recovery apparatus comprising a first stage, closed circuit heat recovery apparatus using water, a second stage, closed circuit heat recovery apparatus using fluorocarbon working fluid, and an off-gas open circuit, wherein:

the first stage closed circuit heat recovery apparatus comprises:

a feed water preheater, a steam boiler, a steam superheater, a steam expander, a steam condenser, and a feed water pump, wherein
  i) the steam superheater has heat transfer means for superheating steam by transferring heat from high-temperature off-gas to steam, said steam having been generated in the steam boiler, said steam superheater being in fluid communication with said steam boiler and said steam expander;
  ii) the steam expander has means for expanding said superheated steam and thus forming low pressure steam and producing work energy, said steam expander being connected to a first machine to which the steam expander delivers useful work, said steam expander being in fluid communication with the steam condenser for transmitting the low pressure steam thereto, and also being in fluid communication with the steam superheater;
  iii) the steam condenser has heat transfer means for generating condensed feed water by transferring heat from said low pressure steam to the fluorocarbon working fluid to vaporize liquid fluorocarbon to gas, said steam condenser being in fluid communication with said steam expander and said feed water preheater;
  iv) the feed water preheater has heat transfer means for transferring heat from off-gas to the feed water;
  v) the steam boiler has heat transfer means for transferring heat from off-gas to the feed water to form steam; and
  vi) the feed water pump, located between the steam condenser and the feed water preheater, is for pumping and raising the pressure of the feed water;

the second stage closed circuit heat recovery apparatus comprises a fluorocarbon separator, a fluorocarbon superheater, a fluorocarbon expander, a fluorocarbon condenser and a fluorocarbon pump, wherein
  a) the separator is connected to the heat exchanger in the steam condenser to vaporize some of the fluorocarbon working fluid, and the vapour and liquid fluorocarbon working fluid mixture so formed is returned to the separator, wherein the vapour is separated from the liquid, said separator being in fluid communication with said fluorocarbon condenser and the fluorocarbon superheater;
  b) the fluorocarbon superheater has a heat exchanger for superheating gaseous fluorocarbon working fluid by transferring heat from off-gas to the gaseous fluorocarbon working fluid, said fluorocarbon superheater being in fluid communication with said fluorocarbon separator and said fluorocarbon expander;
  c) the fluorocarbon expander has means for expanding the superheated gaseous fluorocarbon working fluid to form low pressure gaseous fluorocarbon working fluid, said fluorocarbon expander being able to produce shaft work and being connected to a second machine for using such work, said fluorocarbon expander being in fluid communication with said fluorocarbon superheater and said fluorocarbon condenser;
  d) the fluorocarbon condenser has a heat exchanger for generating liquid fluorocarbon working fluid by transferring heat from the fluorocarbon working fluid to a cooling fluid to condense the fluorocarbon working fluid, said fluorocarbon condenser being in fluid communication with said fluorocarbon expander and said fluorocarbon separator; and
  e) the fluorocarbon pump is for raising the pressure and for pumping the liquid fluorocarbon from the fluorocarbon condenser to the fluorocarbon separator;

and the off-gas open circuit comprises
  a first pipe for introducing high temperature off-gas into the steam superheater heat exchanger;
  a second pipe connecting the steam superheater heat exchanger to the steam boiler heat exchanger, for transmitting off-gas therethrough;
  a third pipe connecting the steam boiler heat exchanger to the fluorocarbon superheater heat exchanger, for transmitting off-gas therethrough;
  a fourth pipe connecting the fluorocarbon superheater heat exchanger to the feed water preheater heat exchanger, for transmitting off-gas therethrough; and
  a fifth pipe for exhausting off-gas from the feed water preheater to atmosphere.

In a preferred embodiment the first and second stage closed circuit heat recovery apparatus also comprises:

a liquid fluorocarbon working fluid preheater, in which the fluorocarbon preheater has a heat exchanger for transferring heat from feed water to liquid fluorocarbon working fluid, said fluorocarbon preheater being in fluid communication with said separator and said fluorocarbon condenser; and wherein the fluorocarbon pump is situated between the fluorocarbon condenser and the fluorocarbon preheater.

In one embodiment the steam expander is selected from the group consisting of turbines, reciprocating engines and rotary engines. Preferably the steam expander is a turbine.

In another embodiment at least one of the feed water preheater, the steam superheater, the fluorocarbon preheater and the fluorocarbon superheater is of counterflow design.

In a further embodiment the fluorocarbon expander is selected from rotary engines and turbines. Preferably the fluorocarbon expander is a rotary machine, e.g. a gerotor.

In a preferred embodiment the first and second machines are electric generators.

In yet another embodiment the off-gas may be exhausted to atmosphere from the water preheater, either directly or through an air pollution control device.

DETAILED DESCRIPTION OF PREFERRED EMBODIMENTS

Figure 1:
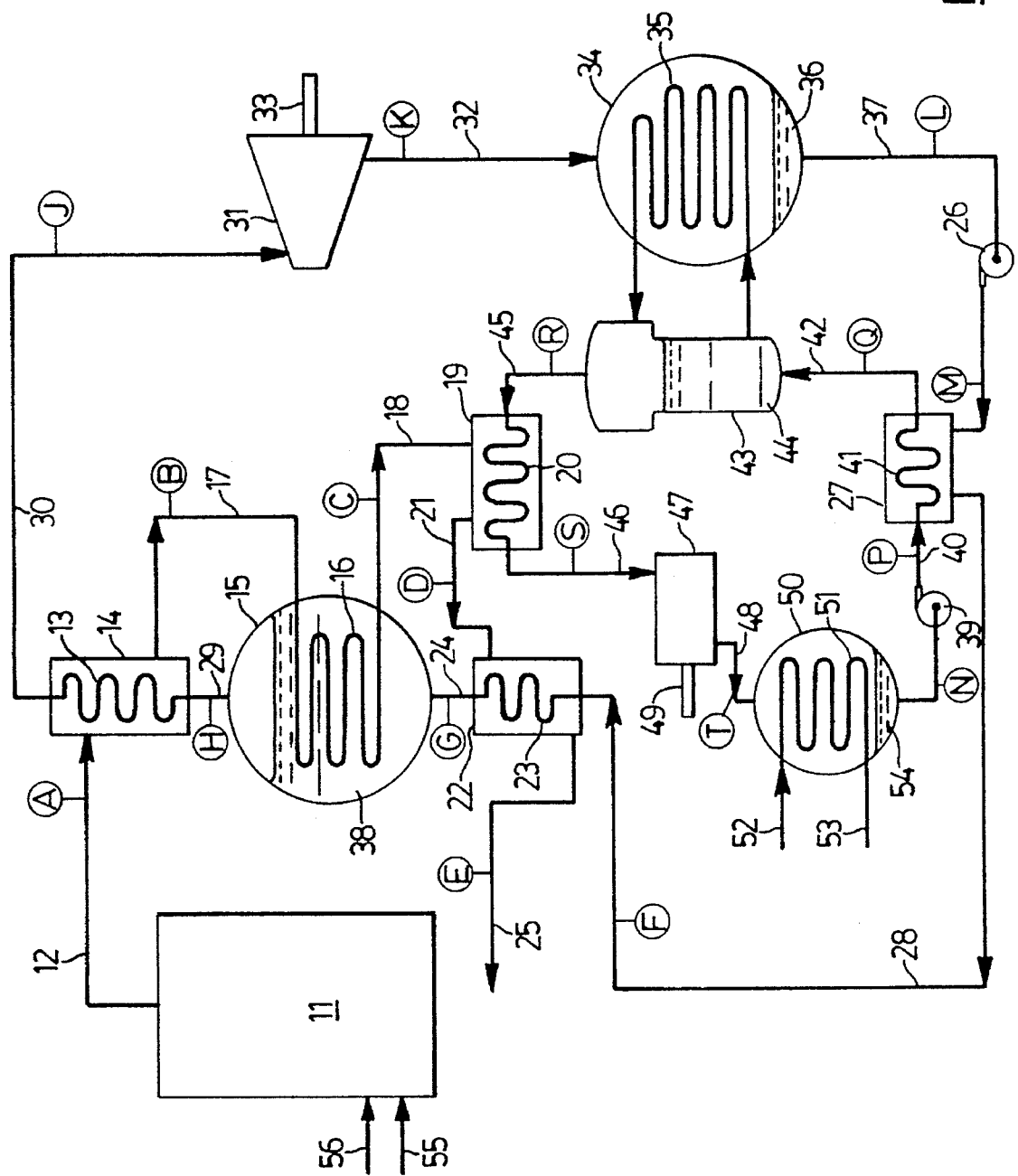
FIG. 1 is a schematic drawing of a preferred process of the present invention.

In the drawing, furnace 11 is used to burn carbonaceous material, e.g. gaseous, liquid or solid waste matter, coal, oil or gas. The off-gases are directed through piping 12 first to a heat exchanger 13 in steam superheater 14. In steam superheater 14 the off-gases are used to superheat steam which has been vaporized in boiler 15. The heat exchanger 16 in boiler 15 is supplied by hot off-gases through pipe 17 from the exit of superheater 14. The off-gases exit from the heat exchanger 16 through pipe 18 and enter fluorocarbon superheater 19. Fluorocarbon superheater 19 has a heat exchanger 20, through which gaseous fluorocarbon working fluid flows. The off-gases exit from fluorocarbon superheater 19 and are directed through pipe 21 to feed water heater 22. Feed water heater 22 has a heat exchanger 23 therein through which feed water passes, exiting through pipe 24 to boiler 15. After leaving feed water heater 22, the off-gases are then allowed to exit to atmosphere through pipe 25. The off-gases may be treated with an air pollution control device prior to being exhausted to atmosphere, for example to remove sulphur dioxide, hydrocarbons, particulates or other pollutants. This paragraph describes the open circuit for the off-gas.

The arrangements of fluorocarbon superheater 19 and feed water heater 22 are such that the direction of flow of fluid through each respective heat exchanger is counter to the direction of flow of fluid surrounding each respective heat exchanger. It is advantageous although not essential that such heat exchangers are of such counterflow design.

In the process of the present invention, there are two closed circuits; one for steam/water and one for gaseous/liquid fluorocarbon working fluid.

In the steam/water closed circuit, feed water is pumped by pump 26 through liquid fluorocarbon preheater 27 (which is described in more detail later) and pipe 28 to the heat exchanger 23 of feed water heater 22. While the pump may be located between fluorocarbon preheater 27 and feed water preheater 22, cavitation in the pump may occur in some situations and it is preferable that the pump be located between steam condenser 34 and fluorocarbon preheater 27. The feed water is pre-heated by feed water heater 22 before it passes through pipe 24 to boiler 15. In boiler 15 feed water 38 is evaporated into steam by transfer of heat from hot off-gases flowing through heat exchanger 16. The steam passes via pipe 29 into heat exchanger 13 of steam superheater 14. The steam is superheated by the action of high temperature off-gases flowing through steam superheater 14 and exits superheater 14 through pipe 30. The high pressure superheated steam enters turbine 31 from pipe 30 and low-pressure steam exits turbine 31 through pipe 32. Turbine 31 is connected via shaft 33 to an electricity generator or other machinery (not shown) for using or generating power. The low-pressure steam then enters steam condenser 34 in which is located heat exchanger 35. Heat from the low pressure steam causes evaporation of fluorocarbon working fluid which flows through heat exchanger 35, and the low-pressure steam condenses. The condensate 36 then flows out of steam condenser 34 through pipe 37 to pump 26, thus completing a cycle in the steam/water closed circuit system.

In the gaseous/liquid fluorocarbon closed circuit, liquid fluorocarbon working fluid is pumped by pump 39 through pipe 40 and heat exchanger 41 in liquid fluorocarbon preheater 27. While pump 39 may be located between fluorocarbon preheater 27 and separator 43, it is preferable that the pump be located between fluorocarbon condenser 50 and fluorocarbon preheater 27. Liquid fluorocarbon working fluid is preheated by feed water flowing around heat exchanger 41. It is preferable that the arrangement of liquid fluorocarbon preheater is such that the flow of liquid fluorocarbon working fluid through heat exchanger 41 is counter to the flow of feed water surrounding the heat exchanger. The liquid fluorocarbon working fluid then passes via pipe 42 to the lower portion of fluorocarbon separator 43. Some of liquid fluorocarbon working fluid 44 is drawn through heat exchanger 35 of steam condenser 34 and is partially evaporated, the liquid and vapour returning to the upper portion of fluorocarbon separator 43. The separator 43 and heat exchanger 35 comprises a recirculation evaporator for fluorocarbon working fluid. The now-gaseous fluorocarbon working fluid leaves fluorocarbon separator 43 through pipe 45 to heat exchanger 20 in fluorocarbon superheater 19. Off-gases passing through fluorocarbon superheater 19 superheat the gaseous fluorocarbon working fluid and the superheated fluorocarbon exits via pipe 46 to fluorocarbon expander 47. The superheated fluorocarbon gas expands in fluorocarbon expander 47 and low-pressure fluorocarbon gas exits via pipe 48 to fluorocarbon condenser 50. Fluorocarbon expander 47 may be a rotary engine such as a gerotor or may be a turbine or similar. Such expander may be used to drive an electric generator or other useful device through rotating shaft 49. The low-pressure fluorocarbon gas is then condensed by cooling air, water or other cooling fluid, e.g. antifreeze solution, which flows from pipe 52 through heat exchanger 51 and out of pipe 53. The condensed fluorocarbon liquid 54 is then fed into pump 39 to complete a cycle in the gaseous/liquid fluorocarbon closed circuit system.

It is to be understood that it is preferred to include fluorocarbon preheater 27 for the sake of improved efficiency, but fluorocarbon preheater 27, with its heat exchanger 41, may be omitted. In such case, fluorocarbon pump 39 is connected directly to separator 43 and feed water pump 26 is connected directly to feed water preheater 22.

In operation, furnace 11 is fed with air and fuel through feeds 55 and 56 respectively. The present invention is particularly useful for furnaces which produce exhaust off-gases at temperatures of about 350° C. to about 1100° C., and is especially useful for furnaces which produce exhaust off-gases at temperatures in the range of about 700° C. to about 1100° C. The fluorocarbon working fluid may be a chlorofluorocarbon (CFC) or a hydrochlorofluorocarbon (HCFC). A useful CFC is trichlorofluoromethane ($CCl_3F$ or CFC-11), available from E.I. du Pont de Nemours and Company of Wilmington, Del., U.S.A. under its FREON® 11 trade mark. Dichlorotrifluoroethane ($CHCl_2CF_3$ or HCFC-123) or chlorotetrafluoroethane ($CHClFCF_3$ or HCFC-124) are the preferred HCFC fluorocarbon working fluids and are available from E.I. du Pont de Nemours and Company under its SUVA®-123 or SUVA®-124 trade marks. HCFC-123 or HCFC-124 are preferred for several reasons. They are less ozone depleting than CFC's if they escape into the atmosphere. They avoid corrosion of the machinery. They are miscible with lubricating oil, and their vapours are much more dense than steam in the 60° C. to 175° C. range, thus allowing more compact machinery and piping than for steam, for the same amount of power generation.

It will be understood by those skilled in the art that controls, safety devices, valves, fittings and thermal insulation, although not shown in the drawing, would be installed for operability, safety and efficiency reasons.

It will also be understood that the system must satisfy the laws of thermodynamics, notably that heat balances must be achieved and heat must flow from a higher temperature to a lower temperature. The following table illustrates satisfaction of these requirements at equilibrium conditions for one realization of the cycle using HCFC-123. The letters correspond to the positions in the drawing.

| POINT | FLUID | PRESSURE kPa | TEMPERATURE °C. |
|---|---|---|---|
| A | off-gas | 101 | 882 |
| B | off-gas | 101 | 743 |
| C | off-gas | 101 | 263 |
| D | off-gas | 101 | 185 |
| E | off-gas | 101 | 54 |
| F | water | 4238 | 38 |
| G | water | 4238 | 149 |

-continued

| POINT | FLUID | PRESSURE kPa | TEMPERATURE °C. |
|---|---|---|---|
| H | steam | 4238 | 254 |
| J | steam | 4238 | 343 |
| K | steam | 244 | 127 |
| L | water | 244 | 127 |
| M | water | 4238 | 128 |
| N | HCFC-123 | 117 | 32 |
| P | HCFC-123 | 1227 | 33 |
| Q | HCFC-123 | 1227 | 66 |
| R | HCFC-123 | 1227 | 121 |
| S | HCFC-123 | 1227 | 146 |
| T | HCFC-123 | 117 | 32 |

The present invention is particularly useful for large installations, e.g. for the generation of 5000 kW electrical power or more.

I claim:

1. A process for the conversion of heat from high-temperature off-gases into useful work, said process comprising first and second stages and heat input, in which:
   the first stage comprises
   i) passing feed water through a feed water preheater which is heated by off-gas, to form preheated feed water
   ii) converting said preheated feed water into steam in a steam boiler which is heated by off-gas;
   iii) superheating said steam in a steam superheater which is heated by off-gas;
   iv) passing said superheated steam into a steam expander which allows expansion of said superheated steam, thus producing shaft work, released as a result of such expansion, to operate a first machine, and exhausting low pressure steam;
   v) feeding said low pressure steam through a steam condenser to form condensed feed water; and
   vi) passing the feed water through the first stage again starting at step i);
   the second stage comprises
   a) passing liquid fluorocarbon working fluid into a separator, from where liquid fluorocarbon working fluid passes through a heat exchanger in said steam condenser thus converting some of the liquid fluorocarbon into gaseous fluorocarbon, whence the mixed liquid and gas is returned to the separator in which the gas is separated from the liquid fluorocarbon;
   b) superheating the gaseous fluorocarbon working fluid in a gaseous fluorocarbon superheater which is heated by off-gas;
   c) passing said superheated gaseous fluorocarbon working fluid through a fluorocarbon expander which allows expansion of said superheated gaseous fluorocarbon working fluid, thus producing low pressure gaseous fluorocarbon working fluid and producing shaft work, released as a result of such expansion, to drive a second machine;
   d) feeding said low pressure gaseous fluorocarbon working fluid through a fluorocarbon condenser to give up its latent heat and form liquid fluorocarbon working fluid;
   e) pumping the liquid fluorocarbon working fluid through the second stage again, starting at step a); and
   the heat input comprises providing heat to the process by passing high temperature off-gas in sequence through the steam superheater, the water boiler, the fluorocarbon superheater and the feed water heater.

2. A process according to claim 1 wherein the first stage also comprises pumping the feed water through a fluorocarbon working fluid preheater before passing the feed water through the first stage, and passing liquid fluorocarbon working fluid from the fluorocarbon condenser to the separator through a fluorocarbon working fluid preheater to preheat the liquid fluorocarbon working fluid, using heat drawn from the condensed water which leaves the steam condenser.

3. A process according to claim 2 wherein the fluorocarbon working fluid is selected from the group consisting of chlorofluorocarbons and hydrochlorofluorocarbons.

4. A process according to claim 3 wherein at least one of the feed water preheater and the fluorocarbon working fluid preheater is arranged as a counterflow preheater.

5. A process according to claim 4 wherein the initial temperature of the high temperature off-gas is from about 350° C. to about 1100° C.

6. A process according to claim 5 wherein the steam expander is selected from the group consisting of turbines, reciprocating expanders and rotary expanders.

7. A process according to claim 6 wherein the fluorocarbon expander is selected from the group consisting of turbines and rotary expanders.

8. A process according to claim 3 wherein the initial temperature of the high temperature off-gas is from about 350° C. to about 1100° C.

9. A process according to claim 8 wherein the steam expander is selected from the group consisting of turbines, reciprocating expanders and rotary expanders.

10. A process according to claim 9 wherein the fluorocarbon expander is selected from the group consisting of turbines and rotary expanders.

11. A process according to claim 1 wherein the initial temperature of the high temperature off-gas is from about 350° C. to about 1100° C.

12. A process for the conversion of heat from high-temperature off-gases into useful work, said off-gases having an initial temperature of at least 350° C., said process comprising first and second stages and heat input, in which:
   the first stage comprises
   i) passing feed water through a counterflow feed water preheater which is heated by off-gas, to form preheated feed water;
   ii) converting said preheated feed water into steam in a steam boiler which is heated by off-gas;
   iii) superheating said steam in a steam superheater which is heated by off-gas;
   iv) passing said superheated steam into a steam expander which allows expansion of said superheated steam, thus producing shaft work, released as a result of such expansion, to operate a first machine, and exhausting low pressure steam;
   v) feeding said low pressure steam through a steam condenser to form condensed feed water; and
   vi) pumping the feed water through a counterflow fluorocarbon working fluid preheater before passing the feed water through the first stage again starting at step i);
   the second stage comprises
   a) passing liquid fluorocarbon working fluid through said fluorocarbon working fluid preheater to preheat the liquid fluorocarbon working fluid, said fluorocarbon working fluid being selected from the group consisting of chlorofluorocarbons and hydrochlorofluorocarbons;

b) passing said preheated liquid fluorocarbon working fluid into a separator, from where liquid fluorocarbon working fluid passes through a heat exchanger in said steam condenser thus converting some of the liquid fluorocarbon into gaseous fluorocarbon, whence the mixed liquid and gas is returned to the separator in which the gas is separated from the liquid fluorocarbon;

c) superheating the gaseous fluorocarbon working fluid in a gaseous fluorocarbon superheater which is heated by off-gas;

d) passing said superheated gaseous fluorocarbon working fluid through a fluorocarbon expander which allows expansion of said superheated gaseous fluorocarbon working fluid, thus producing low pressure gaseous fluorocarbon working fluid and producing shaft work, released as a result of such expansion, to drive a second machine;

e) feeding said low pressure gaseous fluorocarbon working fluid through a fluorocarbon condenser to give up its latent heat and form liquid fluorocarbon working fluid;

f) pumping the liquid fluorocarbon working fluid through the second stage again, starting at step a); and the heat input comprises providing heat to the process by passing high temperature off-gas in sequence through the steam superheater, the water boiler, the fluorocarbon superheater and the feed water heater.

13. A process according to claim 12 wherein the initial temperature of the off-gas is from about 350° C. to about 1100° C.

14. A process according to claim 13 wherein the steam expander is a turbine.

15. A process according to claim 14 wherein the first machine is an electric generator.

16. A heat recovery apparatus comprising a first stage, closed circuit heat recovery apparatus using water, a second stage, closed circuit heat recovery apparatus using fluorocarbon working fluid, and an off-gas open circuit, wherein:

the first stage closed circuit heat recovery apparatus comprises:

a feed water preheater, a steam boiler, a steam superheater, a steam expander, a steam condenser, and a feed water pump, wherein i) the steam superheater has heat transfer means for superheating steam by transferring heat from high-temperature off-gas to steam, said steam having been generated in the steam boiler, said steam superheater being in fluid communication with said steam boiler and said steam expander;

ii) the steam expander has means for expanding said superheated steam and thus forming low pressure steam and producing work energy, said steam expander being connected to a first machine to which the steam expander delivers useful work, said steam expander being in fluid communication with the steam condenser for transmitting the low pressure steam thereto, and also being in fluid communication with the steam superheater;

iii) the steam condenser has heat transfer means for generating condensed feed water by transferring heat from said low pressure steam to the fluorocarbon working fluid to vaporize liquid fluorocarbon to gas, said steam condenser being in fluid communication with said steam expander and said feed water preheater;

iv) the feed water preheater has heat transfer means for transferring heat from off-gas to the feed water;

v) the steam boiler has heat transfer means for transferring heat from off-gas to the feed water to form steam; and vi) the feed water pump, located between the steam condenser and the feed water preheater, is for pumping and raising the pressure of the feed water;

the second stage closed circuit heat recovery apparatus comprises a fluorocarbon separator, a fluorocarbon superheater, a fluorocarbon expander, a fluorocarbon condenser and a fluorocarbon pump, wherein a) the separator is connected to the heat exchanger in the steam condenser to vaporize some of the fluorocarbon working fluid, and the vapour and liquid fluorocarbon working fluid mixture so formed is returned to the separator, wherein the vapour is separated from the liquid, said separator being in fluid communication with said fluorocarbon condenser and the fluorocarbon superheater;

b) the fluorocarbon superheater has a heat exchanger for superheating gaseous fluorocarbon working fluid by transferring heat from off-gas to the gaseous fluorocarbon working fluid, said fluorocarbon superheater being in fluid communication with said fluorocarbon separator and said fluorocarbon expander;

c) the fluorocarbon expander has means for expanding the superheated gaseous fluorocarbon working fluid to form low pressure gaseous fluorocarbon working fluid, said fluorocarbon expander being able to produce shaft work and being connected to a second machine for using such work, said fluorocarbon expander being in fluid communication with said fluorocarbon superheater and said fluorocarbon condenser;

d) the fluorocarbon condenser has a heat exchanger for generating liquid fluorocarbon working fluid by transferring heat from the fluorocarbon working fluid to a cooling fluid to condense the fluorocarbon working fluid, said fluorocarbon condenser being in fluid communication with said fluorocarbon expander and said fluorocarbon separator; and e) the fluorocarbon pump is for raising the pressure and for pumping the liquid fluorocarbon from the fluorocarbon condenser to the fluorocarbon separator;

and the off-gas open circuit comprises a first pipe for introducing high temperature off-gas into the steam superheater heat exchanger;

a second pipe connecting the steam superheater heat exchanger to the steam boiler heat exchanger, for transmitting off-gas therethrough;

a third pipe connecting the steam boiler heat exchanger to the fluorocarbon superheater heat exchanger, for transmitting off-gas therethrough;

a fourth pipe connecting the fluorocarbon superheater heat exchanger to the feed water preheater heat exchanger, for transmitting off-gas therethrough; and a fifth pipe for exhausting off-gas from the feed water preheater to atmosphere.

17. A heat recovery apparatus according to claim 16 wherein the first and second stage closed circuit heat recovery apparatus also comprises:

a liquid fluorocarbon working fluid preheater, in which the fluorocarbon preheater has a heat exchanger for transferring heat from feed water to liquid fluorocarbon working fluid, said fluorocarbon preheater being in fluid communication with said separator and said fluorocarbon condenser; and wherein the fluorocarbon pump is situated between the fluorocarbon condenser and the fluorocarbon preheater.

18. A heat recovery apparatus according to claim 17 wherein at least one of the feed water preheater, the steam superheater, the fluorocarbon preheater and the fluorocarbon superheater is of counterflow design.

19. A heat recovery apparatus according to claim 18 wherein the steam expander is selected from the group consisting of turbines, reciprocating engines and rotary engines.

20. A heat recovery apparatus according to claim 19 wherein at least one of the first and second machines are electric generators.

21. A heat recovery apparatus according to claim 20 wherein the fluorocarbon expander is selected from rotary engines and turbines.

* * * * *